United States Patent
Cade et al.

(10) Patent No.: US 12,416,557 B2
(45) Date of Patent: Sep. 16, 2025

(54) SYSTEM AND METHOD FOR APPLYING A SHEAR TEST TO A THREADED SECTION OF A BOLT

(71) Applicant: RTX Corporation, Farmington, CT (US)

(72) Inventors: Carson W. Cade, South Windsor, CT (US); Allan R. Gorneault, Southington, CT (US)

(73) Assignee: RTX CORPORATION, Farmington, CT (US)

( * ) Notice: Subject to any disclaimer, the term of this patent is extended or adjusted under 35 U.S.C. 154(b) by 336 days.

(21) Appl. No.: 18/167,453

(22) Filed: Feb. 10, 2023

(65) Prior Publication Data

US 2024/0272054 A1 Aug. 15, 2024

(51) Int. Cl.
*G01N 3/24* (2006.01)
*G01N 3/04* (2006.01)

(52) U.S. Cl.
CPC .................. *G01N 3/24* (2013.01); *G01N 3/04* (2013.01)

(58) Field of Classification Search
CPC .. G01N 3/24; G01N 3/04; G01N 3/02; G01N 3/08; G01M 13/00; F16D 9/10; F16B 13/045; F16B 13/065; F16B 13/00; F16B 19/109
See application file for complete search history.

(56) References Cited

U.S. PATENT DOCUMENTS

2021/0062847 A1* 3/2021 McClure ............... F16B 19/109

FOREIGN PATENT DOCUMENTS

| CN | 203894124 U | 10/2014 |
| CN | 105352793 A | 2/2016 |
| CN | 107817172 A | 3/2018 |
| CN | 210513904 U | 5/2020 |
| CN | 210863414 U | 6/2020 |
| CN | 113804540 A | * 12/2021 |
| CN | 215767946 U | 2/2022 |
| CN | 114441290 A | 5/2022 |
| CN | 217561197 U | 10/2022 |

OTHER PUBLICATIONS

European Search Report issued in European Application No. 24157199.1 dated Jun. 25, 2024.

* cited by examiner

*Primary Examiner* — Brandi N Hopkins
(74) *Attorney, Agent, or Firm* — CANTOR COLBURN LLP

(57) ABSTRACT

A system having: a shear die set having a fork that includes first and second legs that are have grooves and are spaced from each other to define a test cavity; and a center sleeve that extends between the legs and is radially larger than the first leg groove, the center sleeve has an inner threaded surface and receives a threaded portion of the bolt; a first support sleeve having an inner threaded surface that receives a threaded portion of the bolt, and the first support sleeve has an outer diameter surface that fits in the first leg groove; and a second support sleeve having a same size and shape as the first support sleeve and receives a threaded portion of the bolt and fits in the second leg groove; and the outer diameter of the first support sleeve is different than the outer diameter of the center sleeve.

20 Claims, 6 Drawing Sheets

SYSTEM AND METHOD FOR APPLYING A SHEAR TEST TO A THREADED SECTION OF A BOLT

BACKGROUND

The embodiments are directed to shear tests and more specifically to a system and method for applying a shear test to a threaded section of a bolt.

Shear tests are mechanical tests that measure a material's shear strength. In a double shear test, a cylindrical test specimen is placed in a set of dies and compressed in such a way to create two planes of shear that act on a cylinder of the specimen. Typically a set of double shear dies is utilized to compress an unsupported region of a test piece in a three-point-bend jig. This configuration provides two planes of shear with minimal bending. The response of the material is measured, and the results are utilized to characterize the engineering qualities of the material. Standard practices exist, such as NASM1312-13, which is a standard published by the Aerospace Industries Association (www.aia-aerospace.org), directed to fastener test methods for double shear tests. The standard addresses tests for smooth shanks of bolts, and smooth shafts and cylinders.

BRIEF SUMMARY

Disclosed is a system including: a shear die set having a fork that includes: a fork-base; a first leg extending from the fork-base to a first end; a second leg extending from the fork-base to a second end, wherein: the first and second legs are spaced apart from each other by a first distance to define a test cavity; and the first leg has a first leg groove, and the second leg has a second leg groove that is aligned with the first leg groove and has a same size and shape as the first leg groove; and a center sleeve having an axial length that corresponds with the first distance and is radially larger than the first leg groove, wherein the center sleeve has an inner threaded surface and is configured to receive a center portion of the threaded section of the bolt during the shear test; a first support sleeve having an inner threaded surface that is configured to receive a first portion of the threaded section of the bolt, and the first support sleeve has an outer diameter surface that is sized to fit in the first leg groove during the shear test; and a second support sleeve having a same size and shape as the first support sleeve, wherein the second support sleeve is configured to receive a second portion of the threaded section of the bolt and fit in the second leg groove during the shear test; and the outer diameter surface of the first support sleeve is radially different than the outer diameter surface of the center sleeve.

In addition to one or more of the above disclosed aspects of the system or as an alternate, the first leg groove is defined by a semi-circular surface; and the center sleeve has an outer diameter surface that is radially larger than the semi-circular surface of the first leg groove.

In addition to one or more of the above disclosed aspects of the system or as an alternate, the outer diameter surface of the first support sleeve is radially smaller than the outer diameter surface of the center sleeve.

In addition to one or more of the above disclosed aspects of the system or as an alternate, the system includes a cutter block having a thickness that corresponds with the first distance, the cutter block having a cutter surface with a cutter groove that is sized to receive the center sleeve during the shear test.

In addition to one or more of the above disclosed aspects of the system or as an alternate, the cutter groove has a linear channel portion and a sleeve seat portion, wherein the linear channel portion extends away from the cutter surface to the sleeve seat portion.

In addition to one or more of the above disclosed aspects of the system or as an alternate, the sleeve seat portion of the cutter groove has an inner diameter surface that is sized to correspond with the outer diameter surface of the center sleeve.

In addition to one or more of the above disclosed aspects of the system or as an alternate, the first leg groove and the cutter groove includes smooth surfaces.

In addition to one or more of the above disclosed aspects of the system or as an alternate, the outer diameter surfaces of the center sleeve and the first support sleeve are smooth.

In addition to one or more of the above disclosed aspects of the system or as an alternate, the system includes a base-member that receives and supports the fork and receives and portions of the bolt that extend axially beyond the fork during a shear test.

In addition to one or more of the above disclosed aspects of the system or as an alternate, the base-member includes upstanding legs that include groves for supporting portions of the bolt that extend axially beyond the fork during a shear test.

Further disclosed is a method of shear testing a threaded section of a bolt, including: threading at least a center sleeve around a center portion of the threaded section of the bolt; threading a first support sleeve around a first portion of the threaded section of the bolt, the first portion being located between the center portion and a head of the bolt, so that the first support sleeve and the center sleeve are adjacent to each other; and threading a second support sleeve around a second portion of the threaded section of the bolt, the second portion being between the center portion and end of the bolt, so that the second support sleeve and the center sleeve are adjacent to each other, wherein an outer diameter surface of the first support sleeve is radially different than an outer diameter surface of the center sleeve; positioning the first support sleeve in a first leg groove of a first leg that extends from fork-base of a fork of a shear die set; positioning the second support sleeve in a second leg groove of a second leg that extends from of the fork-base of the fork, wherein the second leg groove has a same size and shape as the first leg groove, the first and second legs are spaced apart by a first distance to define a test cavity, and the center sleeve has an axial length that corresponds with the first distance and is radially larger than the first leg groove; and applying a cutter block against the center sleeve.

In addition to one or more of the above disclosed aspects of the method or as an alternate, the method includes supporting the fork and portions of the bolt that extend axially beyond the fork with a base-member.

In addition to one or more of the above disclosed aspects of the method or as an alternate, applying the cutter block includes positioning a cutter groove of the cutter block against the center sleeve.

In addition to one or more of the above disclosed aspects of the method or as an alternate, positioning the cutter groove of the cutter block against the center sleeve includes moving the center sleeve through a linear channel portion of the cutter groove until the center sleeve is positioned against a sleeve seat portion of the cutter groove.

Further disclosed is a system for performing a double shear test of a threaded section of a cylinder or bolt, including: a shear die set having a fork and a cutter block;

first and second support sleeves that are configured to engage the threaded section of the bolt, wherein the first and second support sleeves are supported by the fork during the shear test; the second support sleeve has a same size and shape as the first support sleeve; a center sleeve that is radially lager than the first and second support sleeves, wherein the center sleeve is configured to engage the threaded section of the bolt, between the first and second support sleeves; and an outer diameter surface of the first support sleeve is radially different than an outer diameter surface of the center sleeve.

In addition to one or more of the above disclosed aspects of the system or as an alternate, the fork has first and second legs spaced apart from each other by a first distance and the center sleeve has an axial length that corresponds with the first distance to provide a slip fit between the center sleeve and the first and second legs of the fork.

In addition to one or more of the above disclosed aspects of the system or as an alternate, the cutter block has a thickness that corresponds with the first distance to provide a slip fit between the cutter block and the first and second legs of the fork; the cutter block has a cutter surface, that faces a fork-base of the fork during the shear test; the cutter surface has a cutter groove that is sized to receive the center sleeve during the shear test; the cutter groove has a linear channel portion that extends away from the cutter surface to a sleeve seat portion; the sleeve seat portion of the cutter groove has an inner diameter surface that is sized to correspond with an outer diameter surface of the center sleeve; and in operation, the cutter groove of the cutter block receives the center sleeve by moving the center sleeve through the linear channel portion of the cutter groove until the center sleeve is positioned against the sleeve seat portion of the cutter groove.

In addition to one or more of the above disclosed aspects of the system or as an alternate, the outer diameter surfaces of the first and second support sleeves and the center sleeve are smooth and the cutter groove is smooth.

In addition to one or more of the above disclosed aspects of the system or as an alternate, the sleeve seat portion of the cutter groove has a semi-circular cross section.

In addition to one or more of the above disclosed aspects of the system or as an alternate, the system includes a base-member that supports the fork and portions of the bolt that extend axially beyond the fork.

DETAILED DESCRIPTION

Figure 1:
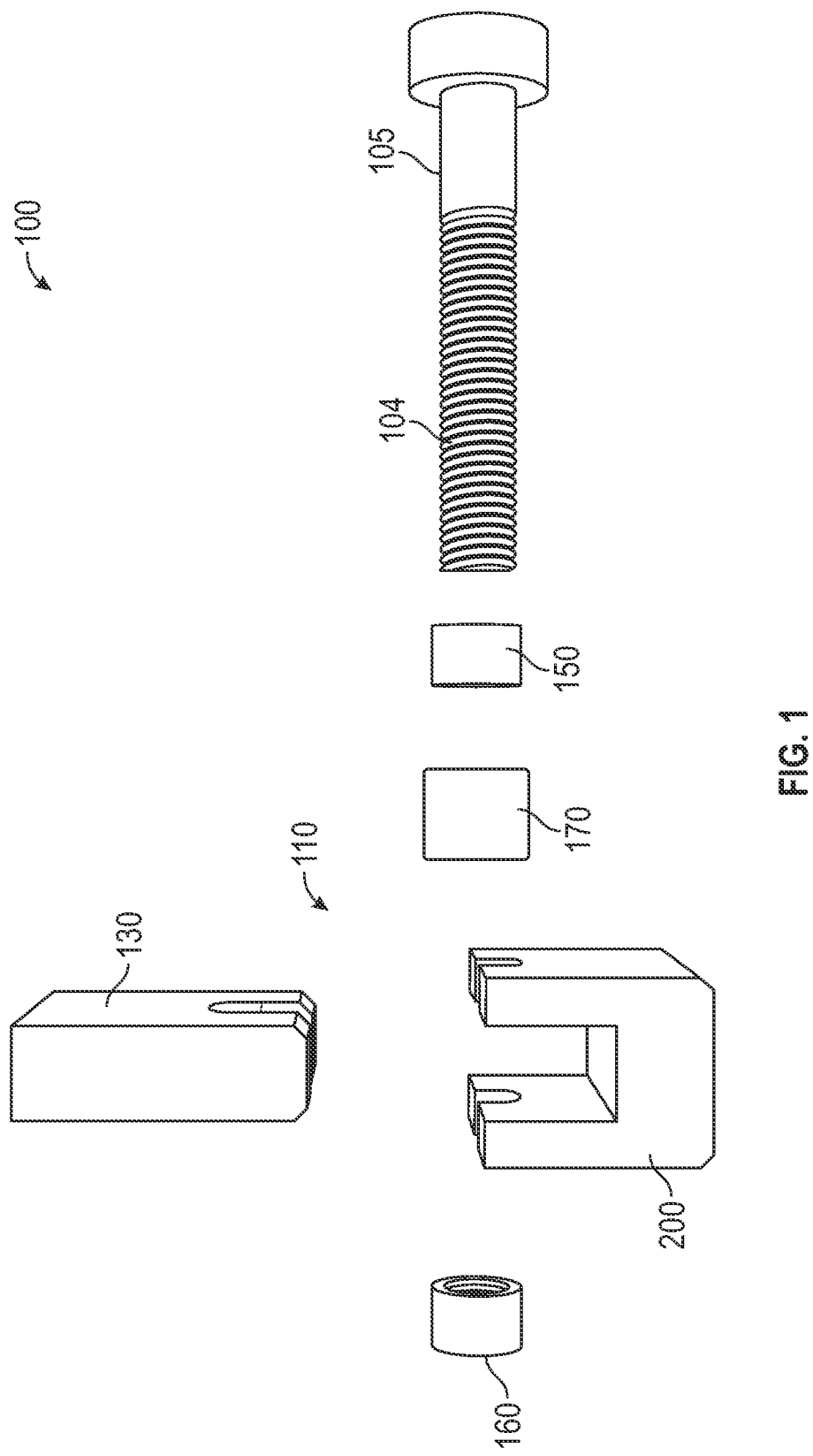
FIG. 1 is an exploded view of a system for shear testing a threaded section of a bolt according to an embodiment, including a fork, cutter block, sleeves and a bolt.
Figure 2:
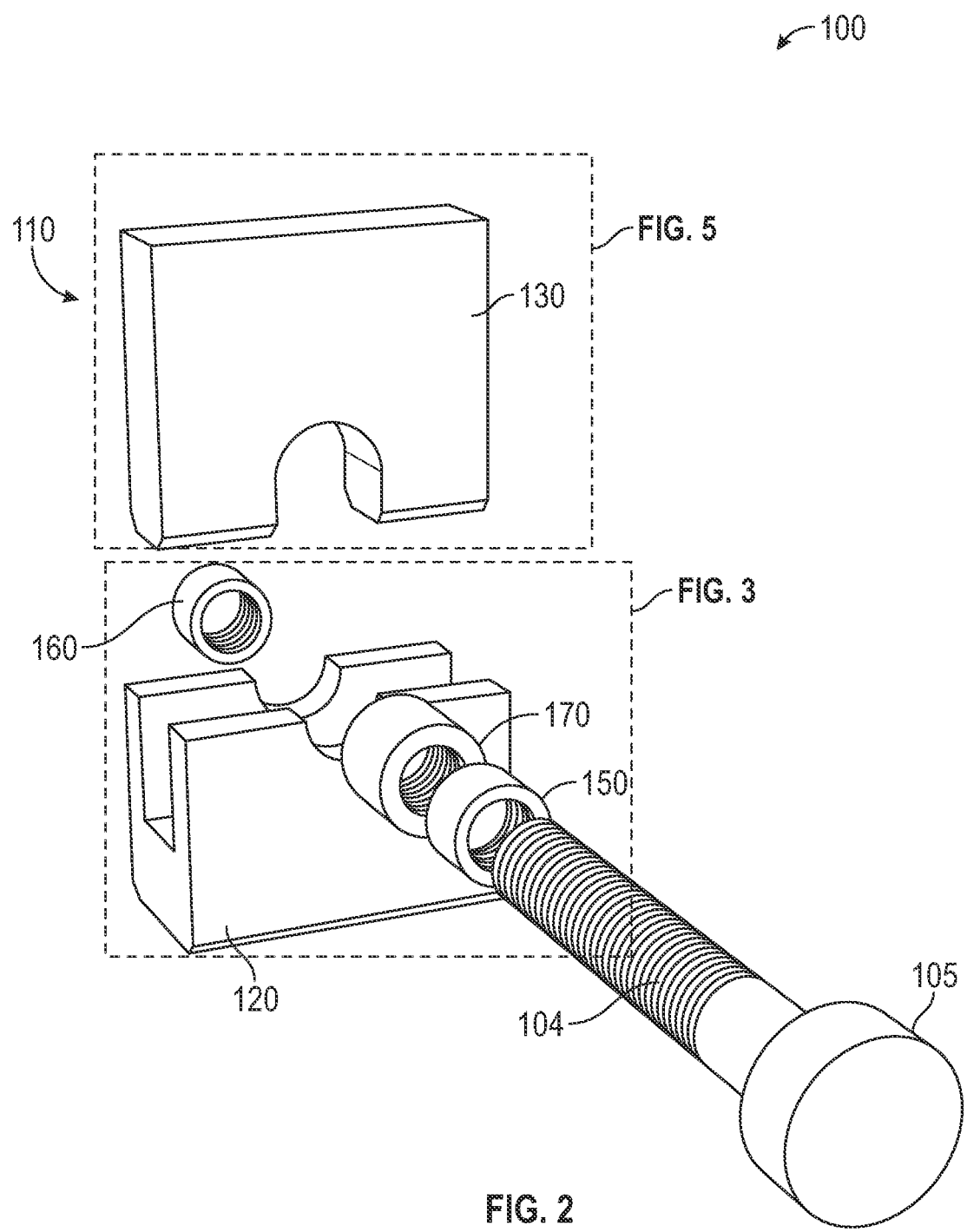
FIG. 2 is a perspective view of the system.

Turning to FIGS. 1 and 2, a system 100 is shown for double shear testing of a threaded section 104 of a cylinder or bolt 105. The system 100 includes a shear die set 110 having a fork 120 and a cutter block 130. The system 100 includes first and second support sleeves 150, 160 that engage the threaded section of the bolt 105 are supported by the fork 120 as discussed below. The second support sleeve 160 has a same size and shape as the first support sleeve 150. A center sleeve 170 that is radially lager than the first and second support sleeves 150, 160 engages the threaded section of the bolt 105, between the support sleeves 150, 160.

Figure 3:
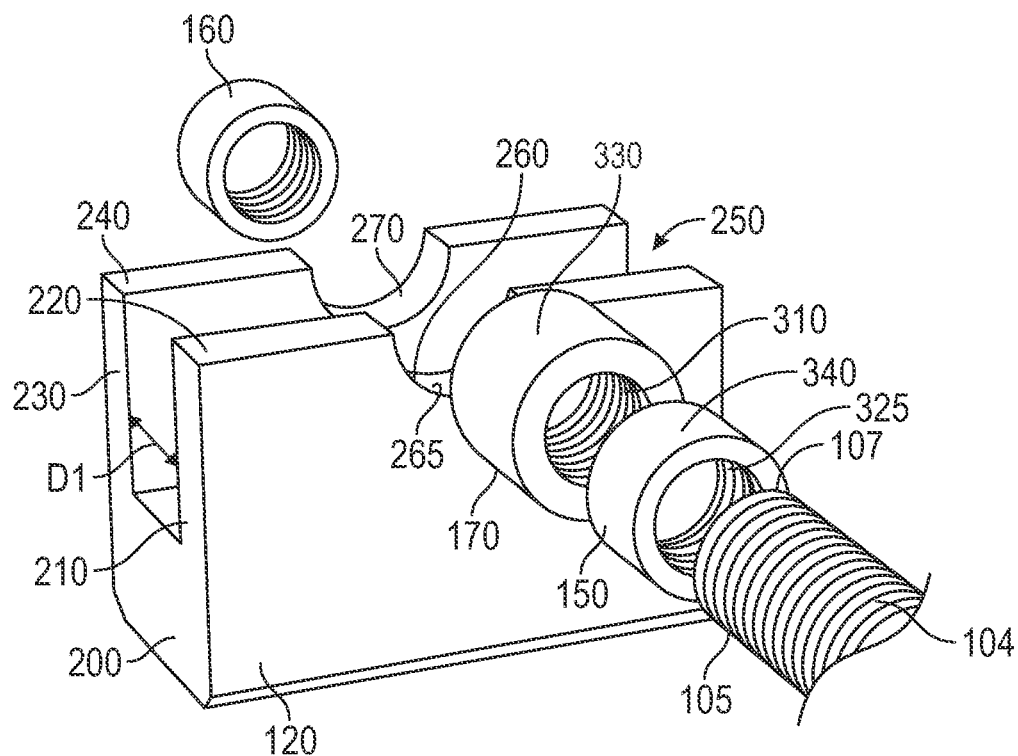
FIG. 3 is a detail of the embodiments identified in FIG. 2, showing aspects of the fork and sleeves.
Figure 4:
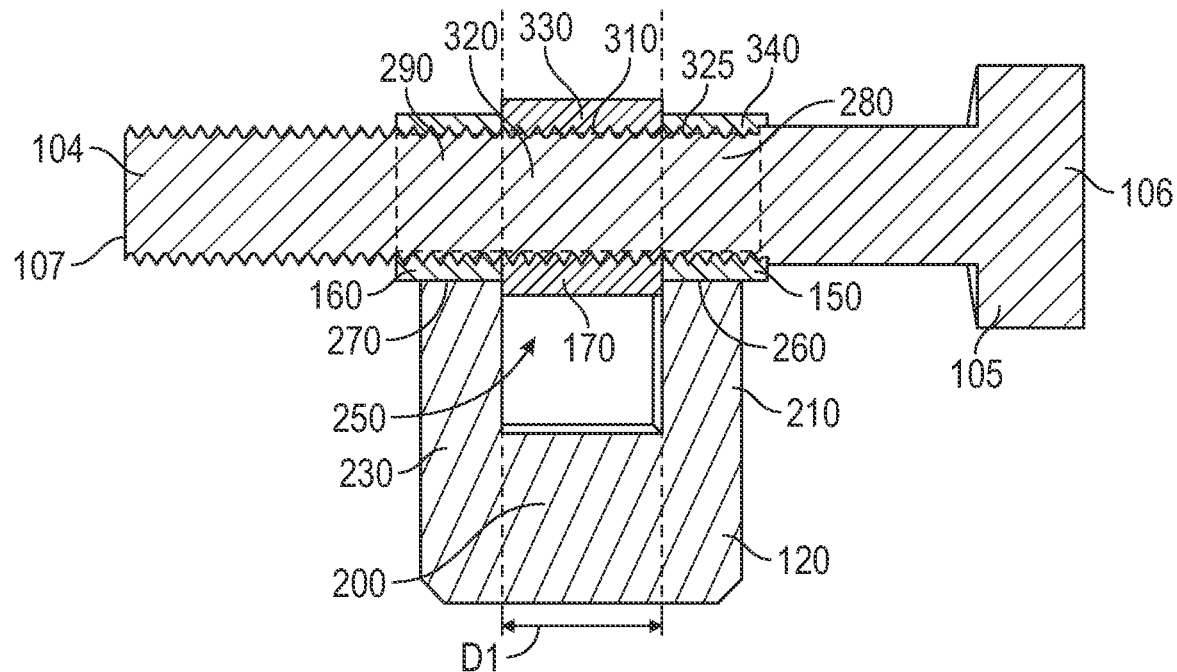
FIG. 4 is an assembly view of the system, without showing the cutter block.

FIGS. 3 and 4 show the fork 120, the sleeves 150-170 and the bolt 105. The fork 120 includes a fork-base 200 and a first leg 210 extending from the fork-base 200 to a first end 220 (FIG. 3). A second leg 230 extends from the fork-base 200 to a second end 240 (FIG. 3). The first and second legs 210, 230 are generally parallel with each other and spaced apart from each other by a first distance D1 to define a test cavity 250.

The first leg 210 has a first leg groove 260 formed into its first end 220. The first leg groove 260 may be defined by a semi-circular surface 265, and the first leg groove 260 may be smooth. The second leg 230 has a second leg groove 270 formed into its second end 240 that is aligned with the first leg groove 260 and has a same size and shape as the first leg groove 260. The first and second leg grooves 260, 270 are configured to support first and second portions 280, 290 (FIG. 4) of the threaded section 104 of the 105 bolt during a shear test.

The center sleeve 170 has an axial length that corresponds with, e.g., is the same as, the first distance D1 to provide a slip fit between the center sleeve 170 and the first and second legs 210, 230 of the fork 120. The center sleeve 170 is radially larger than the first leg groove 260. The center sleeve 170 has an inner threaded surface 310 and is configured to receive a center portion 320 (FIG. 4) of the threaded section 104 of the bolt 105 during the shear test. The first portion 280 of the threaded section 104 of the bolt 105 is between the center portion 320 of the threaded section 104 of the bolt 105 and a head 106 of the bolt 105. With this configuration, the first support sleeve 150 and the center sleeve 170 are axially adjacent to each other during the shear test. The second portion 290 of the threaded section 104 of the bolt 105 is between the center portion 320 and the end 107 of the bolt 105. With this configuration, the second support sleeve 160 and the center sleeve 170 are adjacent to each other during the shear test.

The first support sleeve 150 has an inner threaded surface 325 and is configured to receive the first portion 280 of the threaded section 104 of the bolt 105. The second support sleeve 160 is configured to receive the second portion 290 of the threaded section 104 of the bolt 105 during the shear test.

The center sleeve 170 has an outer diameter surface 330 that is radially larger than the semi-circular surface 265 of the first leg groove 260. An outer diameter surface 340 of the first support sleeve 150 is radially smaller than the outer diameter surface 330 of the center sleeve 170. The outer diameter surface 340 is sized to fit in the first leg groove 260 during the shear test. That is, the center sleeve 170 has an outer diameter that is oversized to allow for proper alignment of the sleeve 170 between the first and second legs 210, 230, e.g., preventing slippage along the leg grooves 260, 270. The outer diameter surfaces 330, 340 of the center sleeve 170 and the first support sleeve 150 are smooth.

It is to be appreciated that reference to the center portion 320 of the threaded section 104 of the bolt 105 is for convenience and not intended to require the shear test be applied to a point halfway along the threaded section 104 of the bolt 105. Any location intermediate the head 106 and the end 107 of the bolt 105 that can be threaded into the center sleeve 170, and is axially surrounded by portions 280, 290 that can be threaded into the support sleeves 150, 160, is part of the center portion 320 of the bolt 105. In addition, the oversized center portion/sleeve 170 aligns the shear plane with the interface of the two sleeves 150, 160, which allows for load to only be applied to the test piece (bolt 105), and not the sleeves 150-170. This improves data quality, and is easier to set up.

Figure 5:
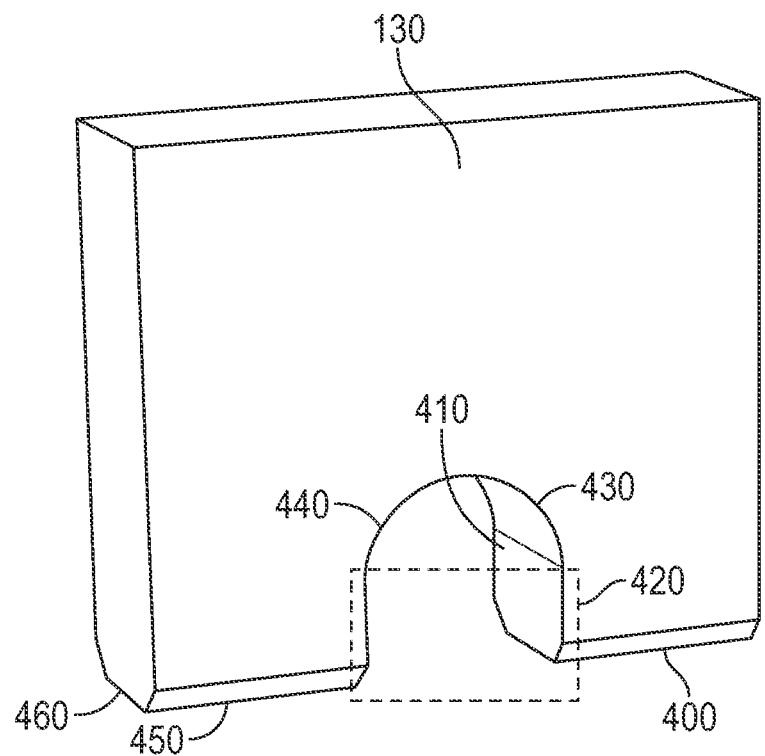
FIG. 5 is a further detail of the embodiments identified in FIG. 2, showing aspects of the cutter block.

Turning to FIG. 5, the cutter block 130 has a thickness that corresponds with, e.g., is equal to, the first distance D1 to provide a slip fit between the cutter block 130 and the first and second legs 210, 230 of the fork 120. The cutter block 130 has a cutter surface 400, that faces the fork-base 200 of the fork 120 when the cutter block 130 is used during a shear test. The cutter surface 400 has a cutter groove 410 that is sized to receive the center sleeve 170 during the shear test. The cutter groove 410 may be smooth. The cutter groove 410 has a linear channel portion 420 that extends away from the cutter surface 400 to a sleeve seat portion 430. The sleeve seat portion 430 of the cutter groove 410 has an inner diameter surface 440 that is sized to correspond with, e.g., is the same size as, the outer diameter surface 330 of the center sleeve 170. That is, the sleeve seat portion 430 has a semi-circular cross section. The cutter groove 410 of the cutter block 130 receives the center sleeve 170 by moving the center sleeve 170 through the linear channel portion 420 of the cutter groove 410 until the center sleeve 170 is positioned against the sleeve seat portion 430 of the cutter groove 410. The cutter surface 400 has chamfered edges 450, 460 to enable orienting the cutter block 130 in the test cavity 250 during a shear test.

Figure 6:
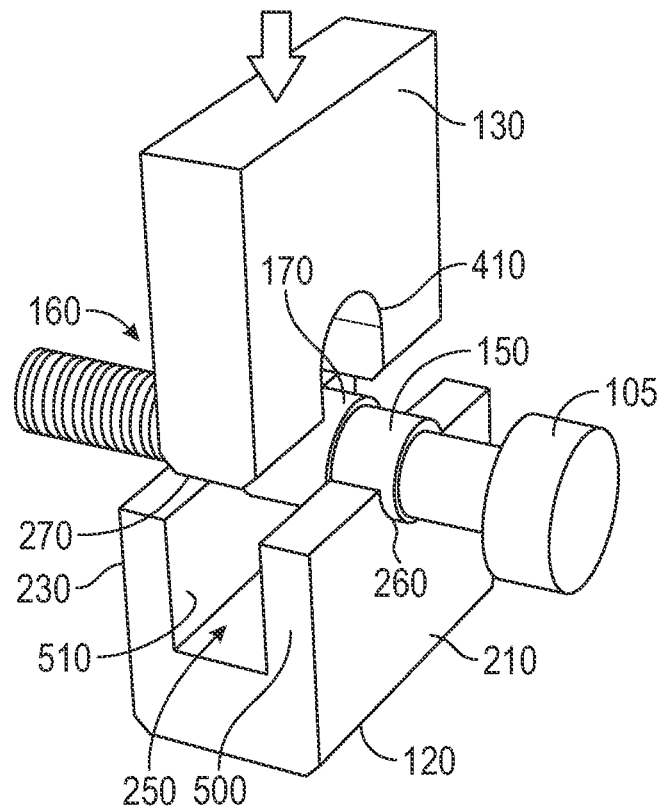
FIG. 6 is shows the testing of the bolt with the system.

Turning to FIG. 6, the disclosed embodiments impose a shear force on the specimen, e.g., the bolt 105, and reduces or prevents minimal bending forces from developing along the center portion 320 (FIG. 4) of the bolt 105 within the test cavity 250. The embodiments provide for the double shear testing of the threaded section 104 of the bolt 105 by the inclusion of the outer support sleeves 150, 160 for supporting the bolt 105, and the oversized center sleeve 170. The sleeves 150-170 are threaded tubes and the center sleeve 170 is sized so its axial ends are on the planes of shear, which are aligned with first and second inner surfaces 500, 510 of the first and second legs 210, 230 of the fork 120. The center sleeve 170 does not contribute to carrying shear load for the bolt 105. The oversized center sleeve 170 which allows for proper alignment of the sleeve 170 between the first and second legs 210, 230 provides for accurate measurements. The cutter block 130 has the oversized cutter groove 410 that is sized to receive and seat the center sleeve 170. With the disclosed embodiments, threads of the bolt 105 are supported by the outer sleeves 150, 160, and all sleeves 150-170 have smooth outer surfaces, to prevent damage to the shear die 110 and prevent skewing shear test results that could result from the deformation of the threads.

Figure 7:
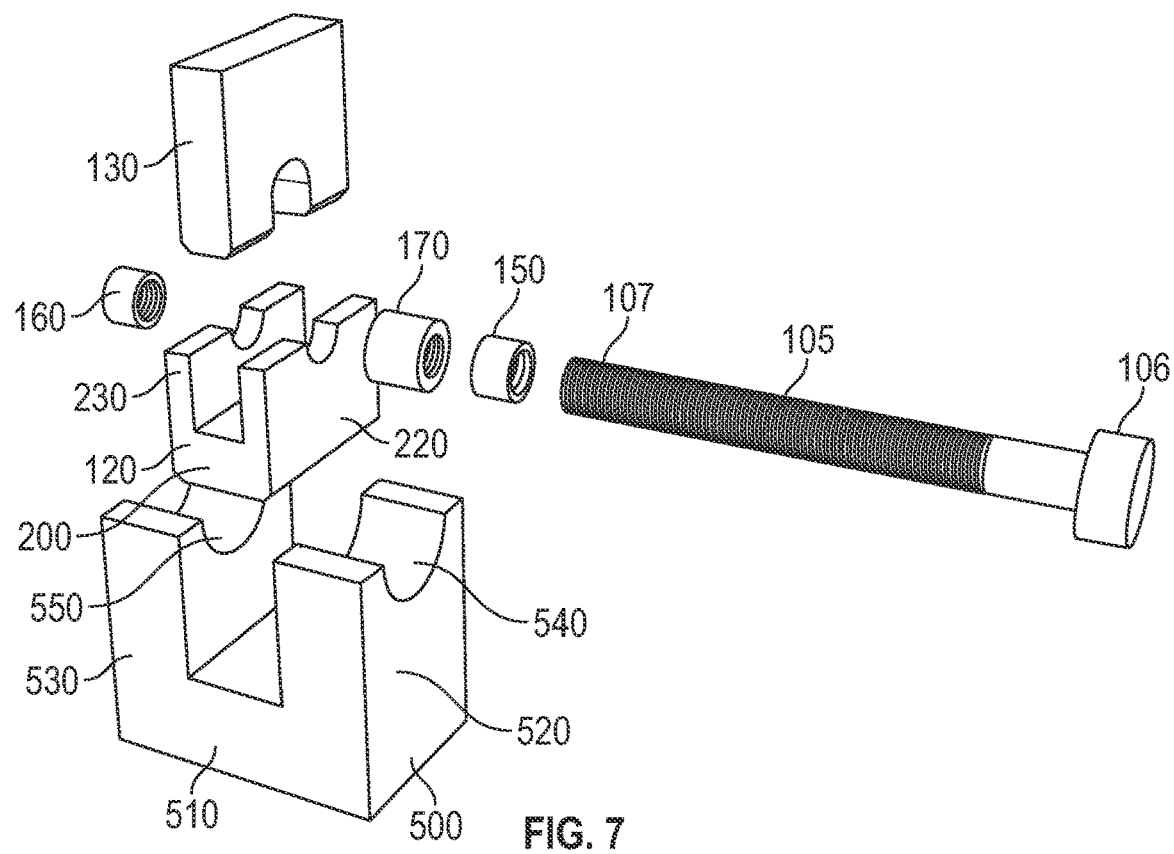
FIG. 7 shows additional components of the system in an exploded view.
Figure 8:
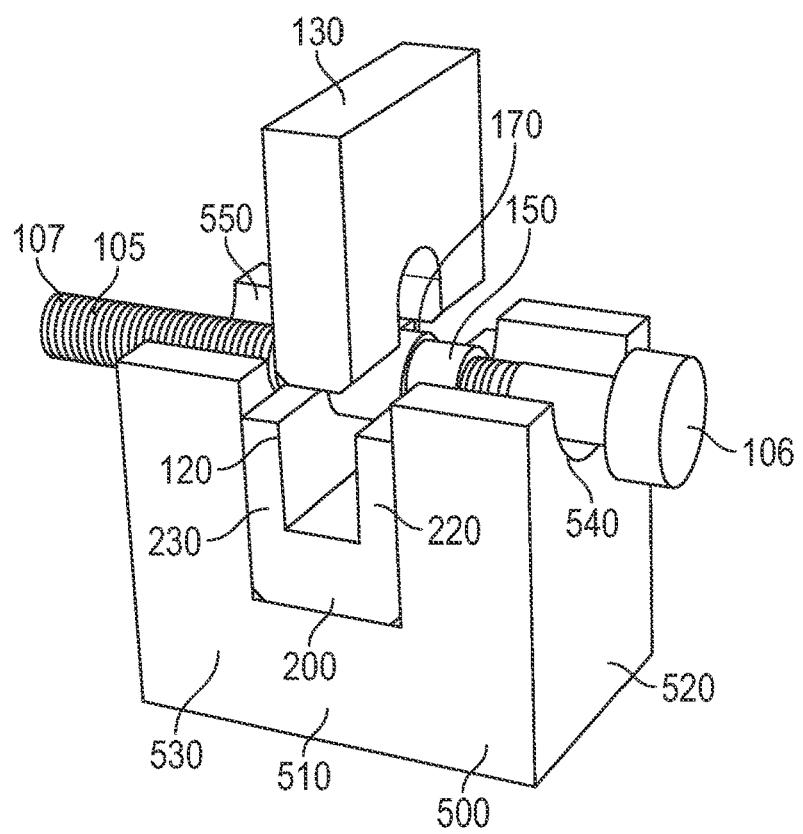
FIG. 8 shows the additional components of the system in an assembly view.

Turning to FIGS. 7 and 8, the system 100 is a die assembly that also includes a base-member 500 that seats therein the fork 120. The base-member 500 has a base 510 and upstanding legs 520 and 530 that support the fork-base 200, fork legs 210, 230, the head 106 of the bolt 105 and the end 107 of the bolt 105 in grooves 540, 550. The grooves 540, 550 in the base-member legs 520, 540 are configured similarly to the grooves 260, 270 in the fork 120. The base-member 500 provides support while the cutter block 130 is applied during a double shear test. During this time, the sleeves 150-170 support the bolt 105 as indicated above, while the base-member 500 that help braces the fork 120 to prevent bending in the system 100.

Figure 9:
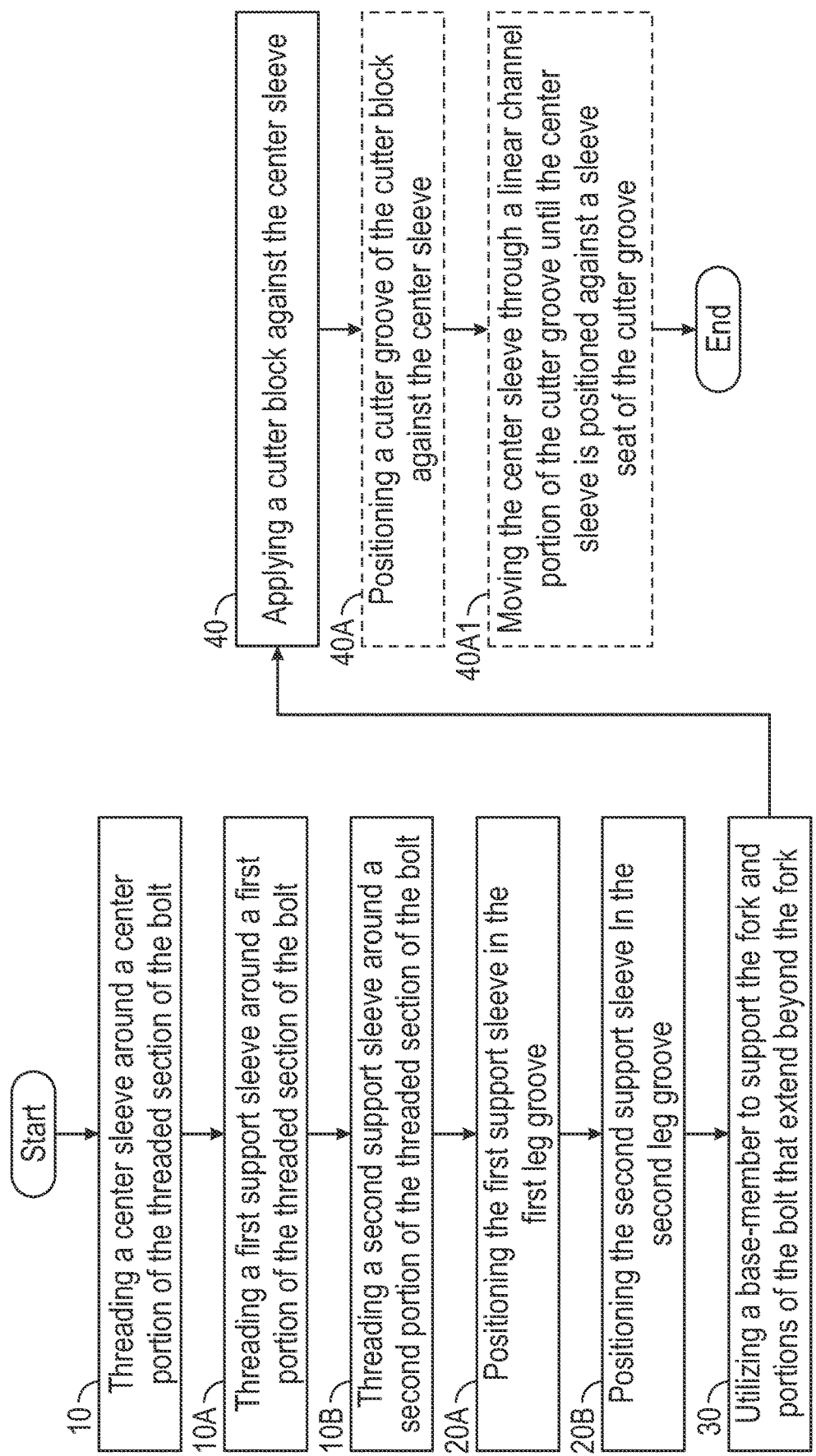
FIG. 9 is a flowchart showing a method of testing a threaded section of a bolt.

Turning to FIG. 9, a flowchart shows a method of shear testing the threaded section 104 of the bolt 105. As shown in block 10, the method includes threading the center sleeve 170 around the center portion 320 of the threaded section 104 of the bolt 105. As shown in block 10A, the method includes block 10A of threading the first support sleeve 150 around the first portion 280 of the threaded section 104 of the bolt 105. As shown in block 10B, the method includes threading the second support sleeve 160 around the second portion 290 of the threaded section 104 of the bolt 105.

As shown in block 20A, the method includes positioning the first support sleeve 150 in the first leg groove 260. As shown in block 20B, the method 270 includes positioning the second support sleeve 160 in the second leg groove 270.

As shown in block 30, the method includes utilizing a base-member 500 to support the fork 120 and portions of the bolt 105 that extend beyond the fork 120. As shown in block 40, the method includes applying the cutter block 130 against the center sleeve 170. As shown in block 40A, applying the cutter block 130 includes positioning the cutter groove 410 of the cutter block 130 against the center sleeve 170. As shown in block 40A1, this includes moving the center sleeve 170 through the linear channel portion 420 of the cutter groove 410 until the center sleeve 170 is positioned against the sleeve seat portion 430 of the cutter groove 410.

The embodiments allow for shear data to be generated for threaded section 104 of the bolt 105 and other threaded fasteners, cylinders and specimen. This allows for the empirical validation and understanding of fasteners and threaded components, as well as for the improvement of material models that this data supports. This also allows for the understanding and realization through mechanical testing of the benefits of specialized processing techniques of fasteners that otherwise may be difficult to model. The embodiments may be applied to the development of testing specifications and quality controls around fasteners. For example, fasteners that include cold-rolled threads for strengthening effects can be testing in shear to measure the impact of the cold-rolled processing method. The center oversized sleeve 170 of the embodiments allow for relatively easy alignment of the sleeves and result in more accurate shear test data.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A system comprising:
a shear die set having a fork that includes:
a fork-base;
a first leg extending from the fork-base to a first end;
a second leg extending from the fork-base to a second end,
wherein:
the first and second legs are spaced apart from each other by a first distance to define a test cavity; and
the first leg has a first leg groove, and the second leg has a second leg groove that is aligned with the first leg groove and has a same size and shape as the first leg groove; and
a center sleeve having an axial length that corresponds with the first distance and is radially larger than the first leg groove, wherein the center sleeve has an inner threaded surface and is configured to receive a center portion of the threaded section of the bolt during the shear test;
a first support sleeve having an inner threaded surface that is configured to receive a first portion of the threaded section of the bolt, and the first support sleeve has an outer diameter surface that is sized to fit in the first leg groove during the shear test; and
a second support sleeve having a same size and shape as the first support sleeve, wherein the second support sleeve is configured to receive a second portion of the threaded section of the bolt and fit in the second leg groove during the shear test; and
the outer diameter surface of the first support sleeve is radially different than the outer diameter surface of the center sleeve.

2. The system of claim 1, wherein:
the first leg groove is defined by a semi-circular surface; and
the center sleeve has an outer diameter surface that is radially larger than the semi-circular surface of the first leg groove.

3. The system of claim 2, wherein:
the outer diameter surface of the first support sleeve is radially smaller than the outer diameter surface of the center sleeve.

4. The system of claim 3, comprising:
a cutter block having a thickness that corresponds with the first distance, the cutter block having a cutter surface with a cutter groove that is sized to receive the center sleeve during the shear test.

5. The system of claim 4, wherein:
the cutter groove has a linear channel portion and a sleeve seat portion, wherein the linear channel portion extends away from the cutter surface to the sleeve seat portion.

6. The system of claim 5, wherein:
the sleeve seat portion of the cutter groove has an inner diameter surface that is sized to correspond with the outer diameter surface of the center sleeve.

7. The system of claim 6, wherein:
the first leg groove and the cutter groove comprise smooth surfaces.

8. The system of claim 7, wherein:
the outer diameter surfaces of the center sleeve and the first support sleeve are smooth.

9. The system of claim 1, including a base-member that receives and supports the fork and receives and portions of the bolt that extend axially beyond the fork during a shear test.

10. The system of claim 9, wherein the base-member includes upstanding legs that include groves for supporting portions of the bolt that extend axially beyond the fork during a shear test.

11. A method of shear testing a threaded section of a bolt, comprising:
threading at least a center sleeve around a center portion of the threaded section of the bolt;
threading a first support sleeve around a first portion of the threaded section of the bolt, the first portion being located between the center portion and a head of the bolt, so that the first support sleeve and the center sleeve are adjacent to each other; and
threading a second support sleeve around a second portion of the threaded section of the bolt, the second portion being between the center portion and end of the bolt, so that the second support sleeve and the center sleeve are adjacent to each other;
wherein an outer diameter surface of the first support sleeve is radially different than an outer diameter surface of the center sleeve;
positioning the first support sleeve in a first leg groove of a first leg that extends from fork-base of a fork of a shear die set;
positioning the second support sleeve in a second leg groove of a second leg that extends from of the fork-base of the fork, wherein the second leg groove has a same size and shape as the first leg groove, the first and second legs are spaced apart by a first distance to define a test cavity, and the center sleeve has an axial length that corresponds with the first distance and is radially larger than the first leg groove; and
applying a cutter block against the center sleeve.

12. The method of claim 11, including supporting the fork and portions of the bolt that extend axially beyond the fork with a base-member.

13. The method of claim 12, wherein applying the cutter block includes positioning a cutter groove of the cutter block against the center sleeve.

14. The method of claim 13, wherein positioning the cutter groove of the cutter block against the center sleeve includes moving the center sleeve through a linear channel portion of the cutter groove until the center sleeve is positioned against a sleeve seat portion of the cutter groove.

15. A system for performing a double shear test of a threaded section of a cylinder or bolt, comprising:
a shear die set having a fork and a cutter block;
first and second support sleeves that are configured to engage the threaded section of the bolt, wherein the first and second support sleeves are supported by the fork during the shear test;
the second support sleeve has a same size and shape as the first support sleeve;
a center sleeve that is radially lager than the first and second support sleeves, wherein the center sleeve is configured to engage the threaded section of the bolt, between the first and second support sleeves; and
an outer diameter surface of the first support sleeve is radially different than an outer diameter surface of the center sleeve.

16. The system of claim 15, wherein:
the fork has first and second legs spaced apart from each other by a first distance and the center sleeve has an axial length that corresponds with the first distance to provide a slip fit between the center sleeve and the first and second legs of the fork.

17. The system of claim 16, wherein:
the cutter block has a thickness that corresponds with the first distance to provide a slip fit between the cutter block and the first and second legs of the fork;
the cutter block has a cutter surface, that faces a fork-base of the fork during the shear test;
the cutter surface has a cutter groove that is sized to receive the center sleeve during the shear test;
the cutter groove has a linear channel portion that extends away from the cutter surface to a sleeve seat portion;
the sleeve seat portion of the cutter groove has an inner diameter surface that is sized to correspond with an outer diameter surface of the center sleeve; and
in operation, the cutter groove of the cutter block receives the center sleeve by moving the center sleeve through the linear channel portion of the cutter groove until the center sleeve is positioned against the sleeve seat portion of the cutter groove.

18. The system of claim 17, wherein:
the outer diameter surfaces of the first and second support sleeves and the center sleeve are smooth and the cutter groove is smooth.

19. The system of claim 18, wherein the sleeve seat portion of the cutter groove has a semi-circular cross section.

20. The system of claim 15, including a base-member that supports the fork and portions of the bolt that extend axially beyond the fork.

* * * * *